June 14, 1938.  G. E. LA V. BARGDILL  2,120,321
ELECTRIC MOTOR
Filed June 22, 1936  2 Sheets-Sheet 1
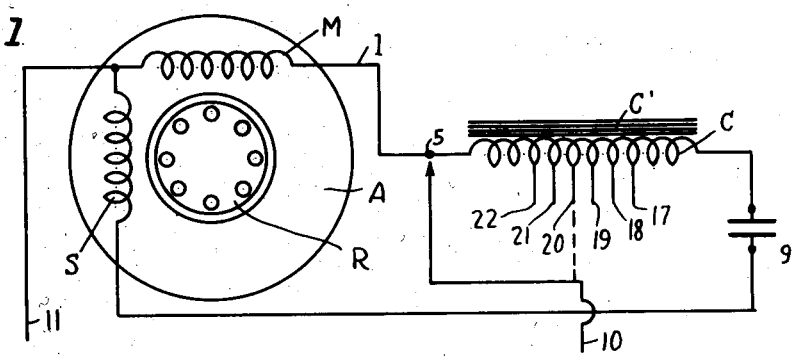
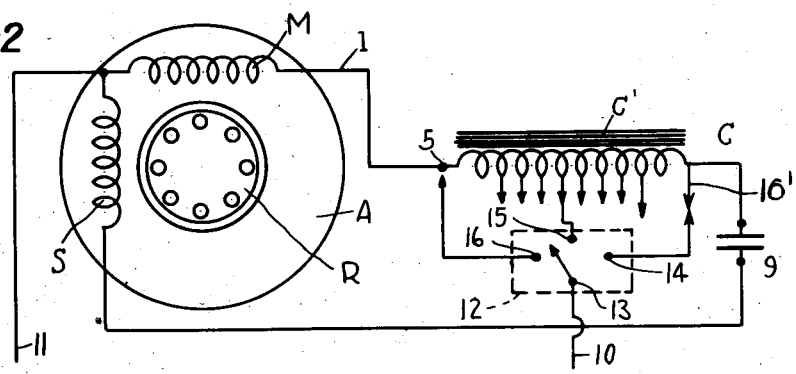
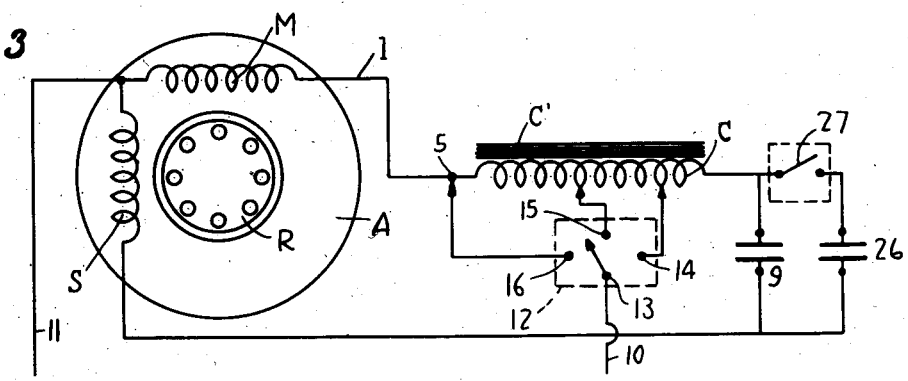
INVENTOR
George Edgar LaVerne Bargdill
BY
Staley + Welch
ATTORNEYS

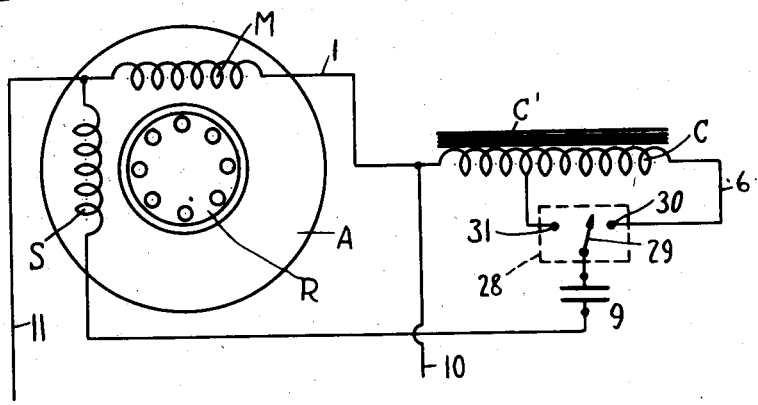
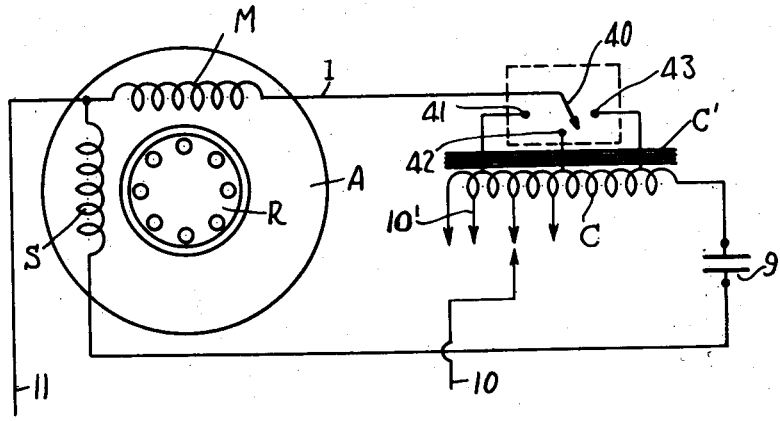

Patented June 14, 1938

2,120,321

UNITED STATES PATENT OFFICE 2,120,321

ELECTRIC MOTOR

George Edgar La Verne Bargdill, Donnelsville, Ohio, assignor to Robbins & Myers, Inc., Springfield, Ohio, a corporation of Ohio Application June 22, 1936, Serial No. 86,527

1 Claim. (Cl. 172—233)

This invention relates to electric motors of the induction type and is particularly directed to single phase condenser motors.

An object of the present invention is to provide a single phase induction motor of the condenser type which gives a low starting current with suitable starting, running and pull-out torques and which is provided with auxiliary means associated with the stator and rotor windings to improve the power factor and use effectively the copper in the stator and associated windings.

It is also an object of this invention to provide a motor of the kind described, having auxiliary means associated with the stator windings for the adjustment of speed.

It is a further object of this invention to provide a motor of the kind described, having capacitance associated with the stator windings and provided when necessary with means for varying the effective action of such capacitance.

It is a further object of this invention to provide a motor of the kind described having auxiliary means associated with the stator windings and capacitance for varying the effective impedance of the stator windings and their associated circuits.

It is a further object of this invention to provide a motor of the kind described having main and auxiliary windings in space-phase displacement, preferably of 90°, connected in association with capacitance and an auxiliary inductive reactance arranged to control the effective reactance of the associated circuits. Such motor windings, the associated auxiliary reactance and capacitance being designed in coordination to improve the speed-torque characteristics of the motor as well as to control the motor's output and speeds under load.

It is a further object of this invention to provide a motor as described, wherein the rotor windings are designed in coordination with the stator windings and associated auxiliary inductive reactance and capacitance to improve the power factor resulting from such windings and give a high starting torque at low as well as high speeds and good speed torque characteristics, when running at different speeds.

It is a further object of this invention to provide a motor of the kind described which is provided when necessary with a means for varying the effective action of the inductive reactance and capacitance when connected in association with the motor windings.

It is a further object of this invention to provide a motor of the kind described which is efficient in operation under varying conditions, which gives different speeds and which is capable of being economically manufactured.

Other and further important objects of this invention will be apparent from the disclosures in the specifications and accompanying drawings.

The present invention consists of an induction motor having a rotor, a stator with at least two primary windings or the equivalent, comprising a main or line winding, and an auxiliary winding, the windings being connected in effective association with an inductive reactance and capacitance. The quadrature arrangement of the motor windings permits the operation of the motor in a manner similar to that of a two-phase motor. The desired results of this present invention are obtained by employment of proper magnitudes of the total impedance of the main winding circuit, the total impedance of the auxiliary winding circuit including the capacitance of the condenser, by use of an auxiliary inductive reactance, a part or all of which can be shifted from the main winding circuit to the auxiliary winding circuit, or the reverse of this, producing the desired results which will be more fully explained.

In the accompanying drawings:

Fig. 1 illustrates a schematic arrangement of one form of a single phase induction motor embodying features of this invention.

Fig. 2 is a schematic arrangement of the same form of motor with an added feature of a switch for controlling the speed.

Fig. 3 is a schematic arrangement similar to Figs. 1 and 2, showing an additional condenser and centrifugal device for cutting out one of the condensers.

Fig. 4 is a schematic arrangement similar to Fig. 1 with the added feature of a switch to control the impedance.

Fig. 5 is a modification in the manner of connecting the main winding with the inductive coil.

Referring first to Fig. 1, the motor is comprised of a rotor R and a stator A with primary windings. The main stator winding M is connected to the lines at 10 and 11. One side of the auxiliary stator winding S is connected to the line at 11. The other side is connected in series with the auxiliary inductive reactance coil C and capacitance 9 and thence to the line at 5 and 10. The inductive coil C is not mutually coupled with relation to the stator windings; that is, it is in no sense a stator winding and if desired may be located externally of the motor casing, although this is not essential. The windings M and S respectively may be unlike, and their ratio of turns and sizes of conductors may be determined in the design for accomplishing a given purpose. The rotor R is usually of the squirrel cage type and has a higher resistance than is usual in the ordinary split phase motor, but it is obvious that wound, reaction, and other types may be employed. The displacement between the stator windings as indicated in the drawings is preferably about 90°. The inductive reactance is composed of a coil C wound on any suitable core C'. The coil is preferably wound in sections with taps brought out to give the preferred performance desired from its association with the other component parts of the circuit arrangement.

Six of these taps are illustrated at 17, 18, 19, 20, 21, 22. It can be seen that the line 10 is connected at 5 on the reactance coil C. In this case all of the inductive reactance of the coil C is in the condenser and auxiliary winding circuit. When full line voltage is impressed across the leads 10 and 11, it is impressed also across the winding M. The current in this winding M will be dephased from that in the auxiliary winding S. The voltage across the winding S will depend upon the impedance and current of the winding S and upon the transformer action between the main and auxiliary stator windings. The current in this auxiliary circuit will in general be leading the impressed voltage and the line current will be the vector sum of the two currents. For a given winding M, this invention permits the use of a fewer number of turns and a larger size of conductor in the auxiliary winding S to obtain desired starting and running torques with a lower loss, resulting in a more efficient motor. Due to the interaction of inductance and capacitance a fairly high voltage will exist across the condenser, which is usually desirable because it permits use of a condenser of small capacity, the voltage being well within the capability of present day condensers.

In the case where line 10 is disconnected at 5 and connected to one of the taps 17, 18, 19, 20, 21 or 22 a part of the reactance in coil C is in series with the main winding M circuit and a part of the reactance coil C is in series with the auxiliary winding S and condenser 9 and it is obvious that the impedance of the associated circuits will in general be changed, thus giving a different performance. The coil C in this case acts as a current transformer.

It is also obvious that lead 1 of main winding M may be connected to any of the taps while the line 10 is connected to another one of the taps which may further change the performance of the motor, as shown in Fig. 5.

Referring now to Fig. 2, while the motor and auxiliary circuits are similar to that of Fig. 1, a means in the form of a switching device 12 has been added to obtain more than one speed with relatively high starting torques, especially at the lower speeds. It is here also obvious that the line lead 10 may be connected to any tap of the coil C through contacts 13, 14, 15, 16, and 16', while lead 1 of the winding M may be connected to another one of the taps, for example as shown in Fig. 5. When line 10 is connected with 16 in Fig. 2, lead from 16 would obviously be connected with 5, and coil C would act as a choke or reactance in the condenser and auxiliary winding circuit. With line 10 connected with tap 14 the coil C acts as a choke in the main winding circuit.

Fig. 3 illustrates a schematic arrangement similar to Figs. 1 and 2, but with added capacitance. When additional capacitance is needed for starting, an additional condenser 26 may be added to this combination and cut out by means of a suitable switch 27 for running. This switch may be either automatically or manually operated and may be of any well known type.

Fig. 4 illustrates a schematic arrangement similar to Fig. 1, where a switch or other device 28 is added to control the impedance of the auxiliary winding and its associated component parts during starting and running conditions. It is obvious that the leads 10 and 1 may be connected to any of the taps while 6 and any of the taps are connected to the switch or other device as indicated to accomplish the desired results. When the motor is at rest, the centrifugally or manually operated switch member 29 will be in contact with the tap 30 and when the motor is running will be in contact with tap 31.

In Fig. 5, previously referred to, there is shown an arrangement whereby the main stator winding M may be connected to any one of a plurality of taps from the inductive coil C. The lead 1 from the winding M has a movable switch member 40 which may be placed in contact with any one of the taps of the coil C, three of these taps being shown in the present instance indicated at 41, 42 and 43. The main line 10 may also be connected to any one of a plurality of taps 10' of the coil C. The switch member 40 may be automatically or manually operated as desired.

An advantage of this device is that it gives a flexible means of controlling the impedances of the associated circuits. By so doing it is possible to obtain a motor with relatively high efficiency, relatively high starting torques at the connections for the speeds desired, which is economical to manufacture and enables the manufacturer to use a smaller capacitance.

The applied voltage to the motor circuits always remaining the same, the coil C being a part of and in series with either one or both of the circuits and acting as a choke, reactance or current transformer to regulate the current in the circuits without changing the applied voltage.

Having thus described my invention, I claim:

In a single phase induction motor, a rotor, a main stator winding, an auxiliary stator winding, a condenser in series with said auxiliary winding, an inductive coil which is not mutually coupled with the stator windings, said coil being electrically connected with said main winding and with the condenser circuit, said coil being adapted to be so connected with one of the current supply lines that the current may be supplied direct to the main winding and entirely through said coil to the condenser circuit, or the current supplied through a portion of said coil to the main winding and through the remainder of said coil to the condenser circuit, or current supplied mainly through said coil to the main winding and substantially direct to the condenser circuit.

GEORGE EDGAR LA VERNE BARGDILL.